United States Patent
Qin et al.

(10) Patent No.: US 10,291,774 B2
(45) Date of Patent: May 14, 2019

(54) METHOD, DEVICE, AND SYSTEM FOR DETERMINING SPAM CALLER PHONE NUMBER

(71) Applicant: Xiaomi Inc., Beijing (CN)

(72) Inventors: Qiuping Qin, Beijing (CN); Zhijun Chen, Beijing (CN); Fei Long, Beijing (CN)

(73) Assignee: Xiaomi Inc., Beijing (CN)

( * ) Notice: Subject to any disclaimer, the term of this patent is extended or adjusted under 35 U.S.C. 154(b) by 307 days.

(21) Appl. No.: 15/184,446

(22) Filed: Jun. 16, 2016

(65) Prior Publication Data

US 2017/0019534 A1 Jan. 19, 2017

(30) Foreign Application Priority Data

Jul. 13, 2015 (CN) .......................... 2015 1 0408711

(51) Int. Cl.
*H04M 3/436* (2006.01)
*G10L 15/02* (2006.01)
(Continued)

(52) U.S. Cl.
CPC ............. *H04M 3/436* (2013.01); *G10L 15/02* (2013.01); *G10L 15/26* (2013.01);
(Continued)

(58) Field of Classification Search
CPC ............... H04M 3/436; H04M 3/2218; H04M 2201/40; H04M 2203/2038;
(Continued)

(56) References Cited

U.S. PATENT DOCUMENTS 6,470,307 B1 * 10/2002 Turney ................ G06F 17/3061
704/9
2006/0168032 A1 7/2006 Cai et al.
(Continued)

FOREIGN PATENT DOCUMENTS

CN 101472007 A 7/2009
CN 102546992 A 7/2012
(Continued)

OTHER PUBLICATIONS

Notification of Reasons for Refusal issued in Japanese Application No. 2016-526355, from the Japan Patent Office, dated Sep. 26, 2017.
(Continued)

*Primary Examiner* — Ahmad F. Matar
*Assistant Examiner* — Jirapon Intavong
(74) *Attorney, Agent, or Firm* — Finnegan, Henderson, Farabow, Garrett & Dunner LLP

(57) ABSTRACT

A method for determining a spam caller phone number is disclosed. The method may include obtaining N suspicious numbers in a call record set, wherein the N suspicious numbers are first N unknown numbers in a predetermined number of target call records that have the highest frequencies of appearance, determining whether a spam caller feature word recorded in a preset dictionary exists in keywords contained in a target call record of each suspicious number, and if a spam caller feature word recorded in the preset dictionary exists in keywords contained in the target call record of a suspicious number, determining the suspicious number to be a spam caller phone number.

14 Claims, 16 Drawing Sheets

(51) Int. Cl.
*G10L 15/26* (2006.01)
*H04M 3/22* (2006.01)

(52) U.S. Cl.
CPC ...... *H04M 3/2218* (2013.01); *H04M 2201/40* (2013.01); *H04M 2203/2038* (2013.01); *H04M 2203/551* (2013.01); *H04M 2203/6027* (2013.01)

(58) Field of Classification Search
CPC .... H04M 2203/551; H04M 2203/6027; G10L 15/02; G10L 15/26
USPC .................................................. 379/210.02
See application file for complete search history.

(56) References Cited

U.S. PATENT DOCUMENTS

| | | | | |
|---|---|---|---|---|
| 2009/0147930 | A1* | 6/2009 | Rice | H04M 3/5335 379/88.12 |
| 2010/0197275 | A1 | 8/2010 | Yamasaki | |
| 2011/0280160 | A1 | 11/2011 | Yang | |
| 2014/0120885 | A1* | 5/2014 | Luneau | H04M 3/2281 455/414.1 |

FOREIGN PATENT DOCUMENTS

| | | | |
|---|---|---|---|
| CN | 103354575 | A | 10/2013 |
| CN | 103647882 | A | 3/2014 |
| CN | 104104772 | A | 10/2014 |
| CN | 104184872 | A | 12/2014 |
| CN | 104580650 | A | 4/2015 |
| CN | 104580725 | A | 4/2015 |
| CN | 104581729 | A | 4/2015 |
| CN | 105100366 | A | 11/2015 |
| EA | 011840 | B1 | 6/2009 |
| JP | H 10155017 | A | 6/1998 |
| JP | 2004-096502 | A | 3/2004 |
| JP | 2007-139864 | A | 6/2007 |
| JP | 2007-228384 | A | 9/2007 |
| JP | 2007-266944 | A | 10/2007 |
| JP | 2010-258556 | A | 11/2010 |
| JP | 2012-005010 | A | 1/2012 |
| JP | 2013-005205 | A | 1/2013 |
| KR | 10-2006-0071361 | A | 6/2006 |
| KR | 10-0742130 | B1 | 7/2007 |
| KR | 10-2010-0033565 | A | 3/2010 |
| KR | 10-1033870 | B1 | 5/2011 |
| RU | 2479035 | C2 | 4/2013 |
| WO | WO 2006/085565 | A1 | 8/2006 |
| WO | WO 2007/141247 | A1 | 12/2007 |
| WO | WO 2008/031871 | A1 | 3/2008 |
| WO | WO 2013/086860 | A1 | 6/2013 |
| WO | WO 2015/054993 | A1 | 4/2015 |

OTHER PUBLICATIONS

Notification of Reason for Refusal issued in Korean Application No. 10-2016-7011668, from the Korean Patent Office, dated Mar. 30, 2017.
Office Action issued in Chinese Application No. 201510408711.7, from the State Intellectual Property Office of China, dated Aug. 1, 2017.
English version of International Search Report of PCT/CN2015/097746, mailed from the State Intellectual Property Office of China dated Mar. 24, 2016.
Extended European Search Report of European Patent Application No. 16163315.1, from the European Patent Office, dated Dec. 8, 2016.
Office Action issued in Russia Patent Application No. 2016119025/07(029849), dated Apr. 5, 2018.

* cited by examiner

METHOD, DEVICE, AND SYSTEM FOR DETERMINING SPAM CALLER PHONE NUMBER

CROSS-REFERENCE TO RELATED APPLICATIONS

The present application is based upon and claims priority to Chinese Patent Application No. 201510408711.7 filed on Jul. 13, 2015, the entire contents of which are incorporated herein by reference.

TECHNICAL FIELD

The present disclosure relates to the field of security technologies and, more particularly, to a method, a device, and a system for determining a spam caller phone number.

BACKGROUND

Spam callers may call to sell insurance or real estate, or may try to run a scam, and spam caller phone numbers are mostly disturbing people's normal life.

Conventional methods for determining a spam caller phone number involve a large number of users determining whether received numbers are spam caller phone numbers through terminals, and uploading determined spam caller phone numbers to a server. Then, the server gathers the spam caller phone numbers determined by the users to generate a list of spam caller phone numbers. This process may be inefficient for replying on manual inputs.

SUMMARY

Embodiments of the present disclosure provide a method, device and system for determining a spam caller phone number so as to solve the problem in the related technology. The technical solutions are as follows.

One aspect of the present disclosure is directed to a method for determining a spam caller phone. The method may comprise obtaining at least one target call record from at least one terminal. The at least one target call record may form a call record set. The call record set may contain a predetermined number of target call records. Each of the target call records may contain an unknown number and at least one keyword. The at least one keyword may be obtained, by the at least one terminal, according to text data of a call with the unknown number. The at least one keyword represents a call topic of the text data. The unknown number is a number not stored in a contact list of the terminal. The method may further comprise obtaining N suspicious numbers in the call record set, wherein the N suspicious numbers are first N unknown numbers in the predetermined number of target call records that have the highest frequencies of appearance, determining whether a spam caller feature word recorded in a preset dictionary exists in keywords contained in a target call record of each suspicious number, and if a spam caller feature word recorded in the preset dictionary exists in keywords contained in the target call record of a suspicious number, determining the suspicious number to be a spam caller phone number.

Another aspect of the present disclosure is directed to a method for determining a spam caller phone number. The method may comprise obtaining voice call data of a call made with an unknown number and a call record of the call, the call record containing the unknown number and the unknown number not being stored in a contact list, converting the voice call data into text data, obtaining at least one keyword of the text data, the at least one keyword representing a call topic of the text data, generating a target call record according to the obtained at least one keyword and the call record, the target call record containing the unknown number and the at least one keyword, and transmitting the target call record to a server configured to determine whether the unknown number is a spam caller phone number according to the unknown number and the at least one keyword.

Another aspect of the present disclosure is directed to a device for determining a spam caller phone number. The device may comprise a processor and a memory for storing instruction executable by the processor. The processor may be configured to obtain at least one target call record from at least one terminal. The at least one target call record may form a call record set, the call record set may contain a predetermined number of target call records, each of the target call records may contain an unknown number and at least one keyword, the at least one keyword may be obtained, by the at least one terminal, according to text data of a call with the unknown number, the at least one keyword may represent a call topic of the text data, and the unknown number may be a number not stored in a contact list of the terminal. The processor may be further configured to obtain N suspicious numbers in the call record set. The N suspicious numbers may be first N unknown numbers in the predetermined number of target call records that have the highest frequencies of appearance. The processor may be further configured to determine whether a spam caller feature word recorded in a preset dictionary exists in keywords contained in a target call record of each suspicious number, and if a spam caller feature word recorded in the preset dictionary exists in keywords contained in the target call record of a suspicious number, determine the suspicious number to be a spam caller phone number.

Another aspect of the present disclosure is directed to a device for determining a spam caller phone number. The device may comprise a processor and a memory configured to store instructions executable by the processor. The processor may be configured to obtain voice call data of a call made with an unknown number and a call record of the call, the call record containing the unknown number and the unknown number not being stored in a contact list, convert the voice call data into text data, obtain at least one keyword of the text data, the at least one keyword representing a call topic of the text data, generate a target call record according to the obtained at least one keyword and the call record, the target call record containing the unknown number and the at least one keyword, and transmit the target call record to a server configured to determine whether the unknown number is a spam caller phone number according to the unknown number and the at least one keyword.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 4-1 is a flow chart illustrating a method for determining a spam caller phone number, according to an exemplary embodiment.

FIG. 4-2 is a flow chart illustrating obtaining a keyword for determining a spam caller phone number, according to an exemplary embodiment.

FIG. 4-3 is a flow chart illustrating obtaining a keyword factor for determining a spam caller phone number, according to an exemplary embodiment.

FIG. 4-4 is a flow chart illustrating determining a spam caller phone number for determining a spam caller phone number according to an exemplary embodiment.

FIG. 5-1 is a block diagram illustrating a device for determining a spam caller phone number, according to an exemplary embodiment.

FIG. 5-2 is a block diagram illustrating a determining module in the device for determining a spam caller phone number, according to an exemplary embodiment.

FIG. 5-3 is a block diagram illustrating a device for determining a spam caller phone number, according to an exemplary embodiment.

FIG. 6-1 is a block diagram illustrating a device for determining a spam caller phone number, according to an exemplary embodiment.

FIG. 6-2 is a block diagram illustrating a keyword obtaining module in the device for determining a spam caller phone number, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
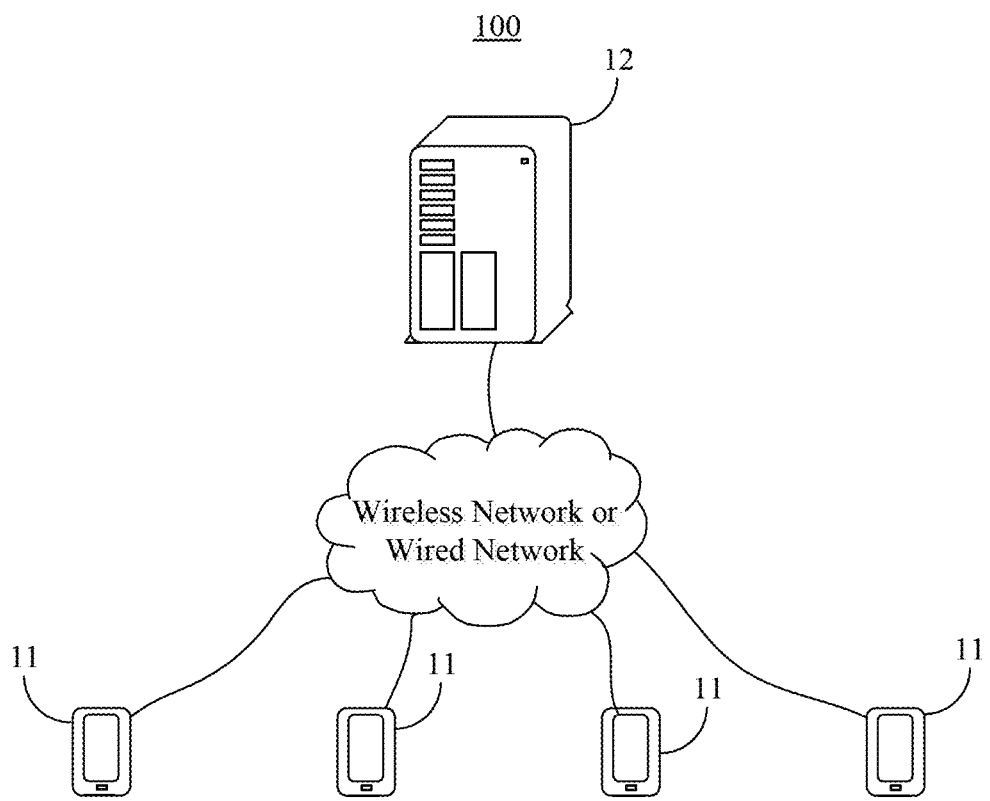
FIG. 1 is a schematic diagram illustrating a system for determining a spam caller phone number, according to an exemplary embodiment of the present disclosure.

FIG. 1 is a schematic diagram illustrating a system 100 for determining a spam caller phone number, according to an exemplary embodiment of the present disclosure. The system 100 may include one or more terminals 11 and a server 12.

Each terminal 11 may be a mobile phone, a tablet computer, a portable laptop computer, a desktop computer, and so on.

The server 12 may be one server, or a server cluster formed by multiple servers, or a cloud computing service center.

A wired connection or a wireless connection may be established between each terminal 11 and the server 12.

Figure 2:
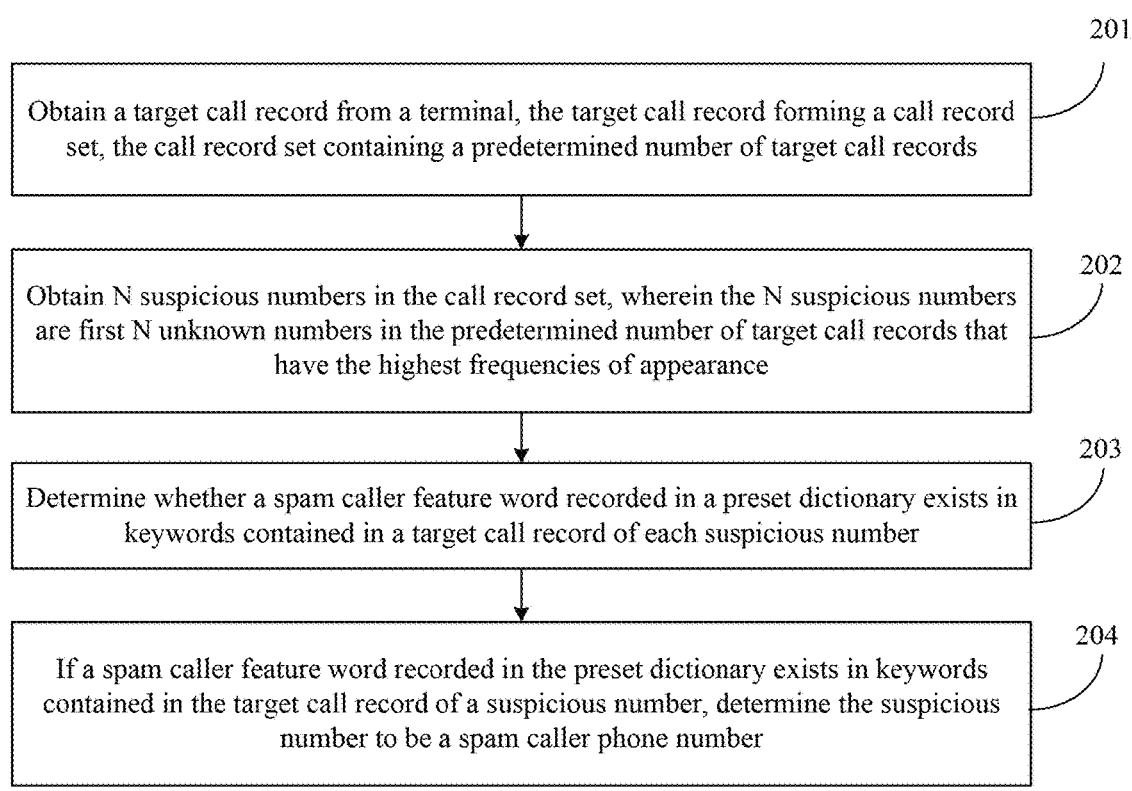
FIG. 2 is a flow chart illustrating a method for determining a spam caller phone number, according to an exemplary embodiment.

FIG. 2 is a flow chart illustrating a method 200 for determining a spam caller phone number, according to an exemplary embodiment. The method 200 can be implemented by, e.g., the server 12 (FIG. 1). Referring to FIG. 2, the method 200 may include the following steps.

Step 201: obtain a target call record from a terminal, the target call record forming a call record set, the call record set containing a predetermined number of target call records. Each of the target call records may contain an unknown number and at least one keyword. The at least one keyword may be obtained by the terminal according to contents of a call, for example, text data of the call, made with the unknown number, and may represent a topic of the contents. The unknown number may be a number not stored in a contact list of the terminal.

Step 202: obtain N suspicious numbers in the call record set, wherein the N suspicious numbers are first N unknown numbers in the predetermined number of target call records that have highest frequencies of appearance.

Step 203: determine whether a spam caller feature word recorded in a preset dictionary exists in keywords contained in a target call record of each suspicious number.

Step 204: if a spam caller feature word recorded in the preset dictionary exists in keywords contained in the target call record of a suspicious number, determine the suspicious number to be a spam caller phone number.

According to the method 100 for determining a spam caller phone number, a server may determine N unknown numbers with the highest frequencies of appearance in a call record set as suspicious numbers, and may further determine a suspicious number having a keyword matching with a spam caller feature word as a spam caller phone number. The keywords may represent a call topic. Thus, a spam caller phone number among a large number of phone numbers in the call record set can be determined conveniently and rapidly, to improve the efficiency in obtaining the spam caller phone number.

Figure 3:
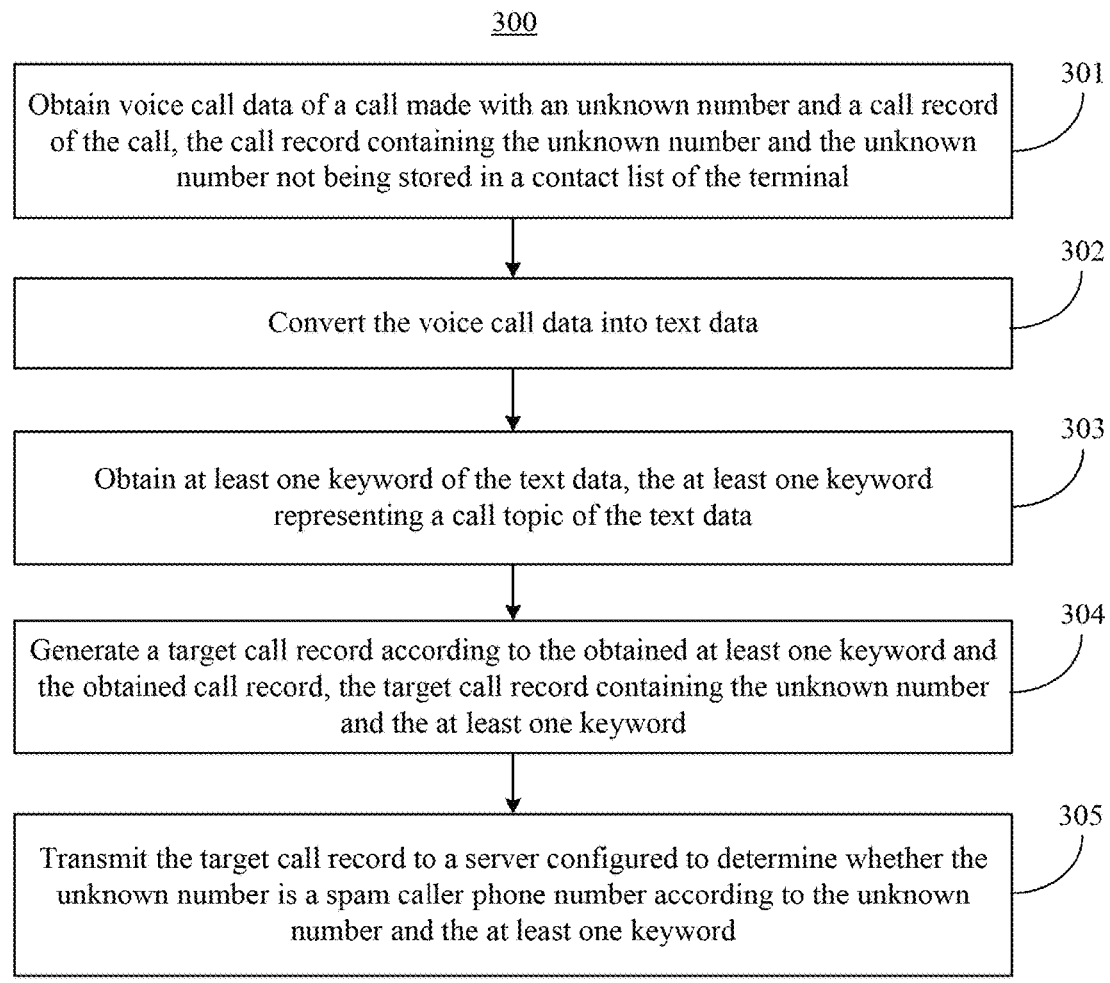
FIG. 3 is a flow chart illustrating a method for determining a spam caller phone number, according to an exemplary embodiment.

FIG. 3 is a flow chart illustrating a method 300 for determining a spam caller phone number, according to an exemplary embodiment. The method 300 can be implemented by, e.g., the terminal 11 (FIG. 1). The method 300 may include the following steps.

Step 301: obtain voice call data of a call made with an unknown number and a call record of the call, the call record containing the unknown number and the unknown number not being stored in a contact list of the terminal.

Step 302: convert the voice call data into text data.

Step 303: obtain at least one keyword of the text data, the at least one keyword representing a call topic of the text data.

Step 304: generate a target call record according to the obtained at least one keyword and the obtained call record, the target call record containing the unknown number and the at least one keyword.

Step 305: transmit the target call record to a server configured to determine whether the unknown number is a spam caller phone number according to the unknown number and the at least one keyword.

According to the method 300 for determining a spam caller phone number, a terminal may obtain a target call record containing an unknown number and at least one keyword, and may transmit the target call record to a server configured to determine whether the unknown number is a spam caller phone number according to the unknown number and the at least one keyword, so that the efficiency in obtaining a spam caller phone number can be improved.

Figures 1, 4:
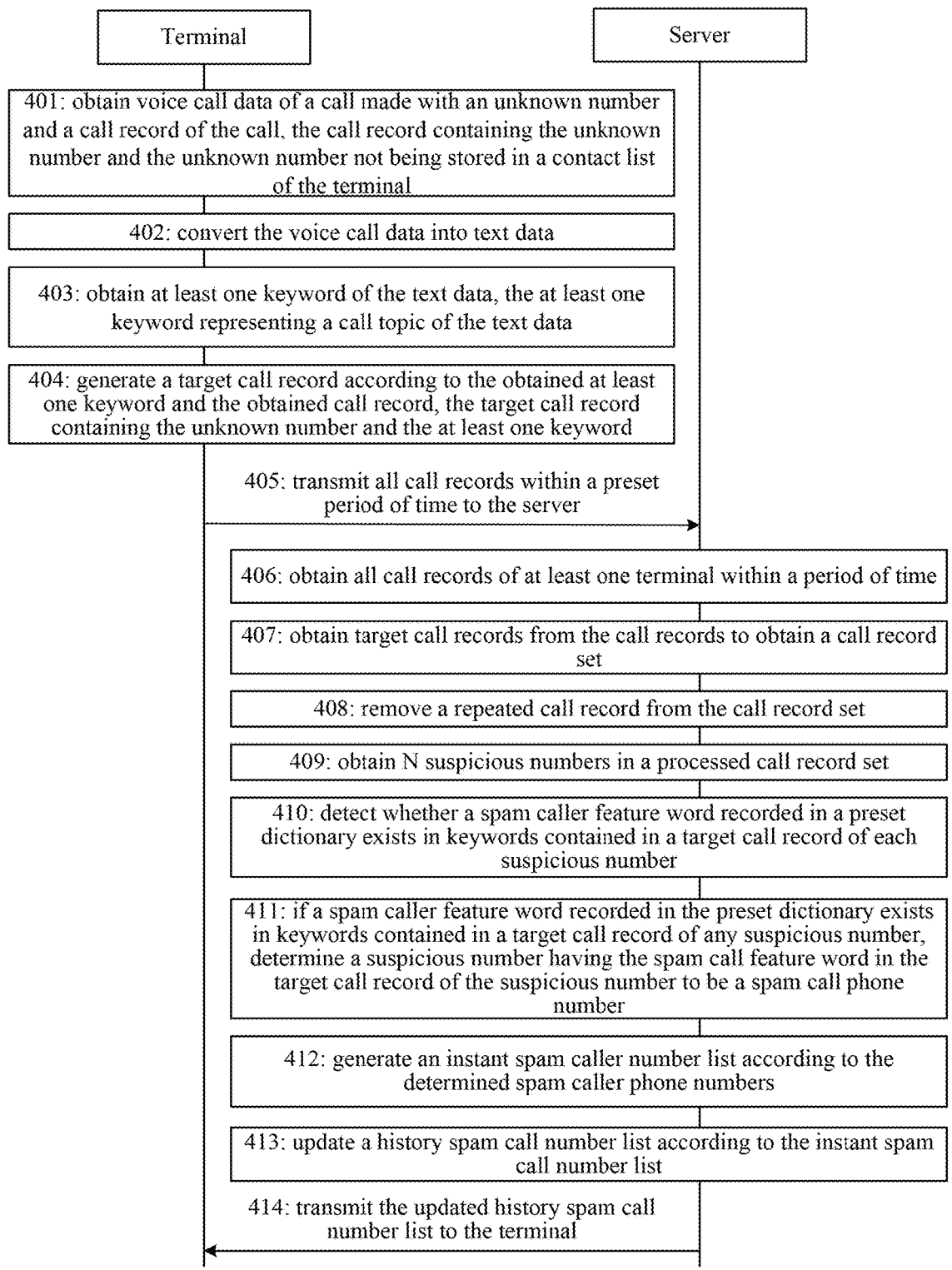
Figures 2, 4:
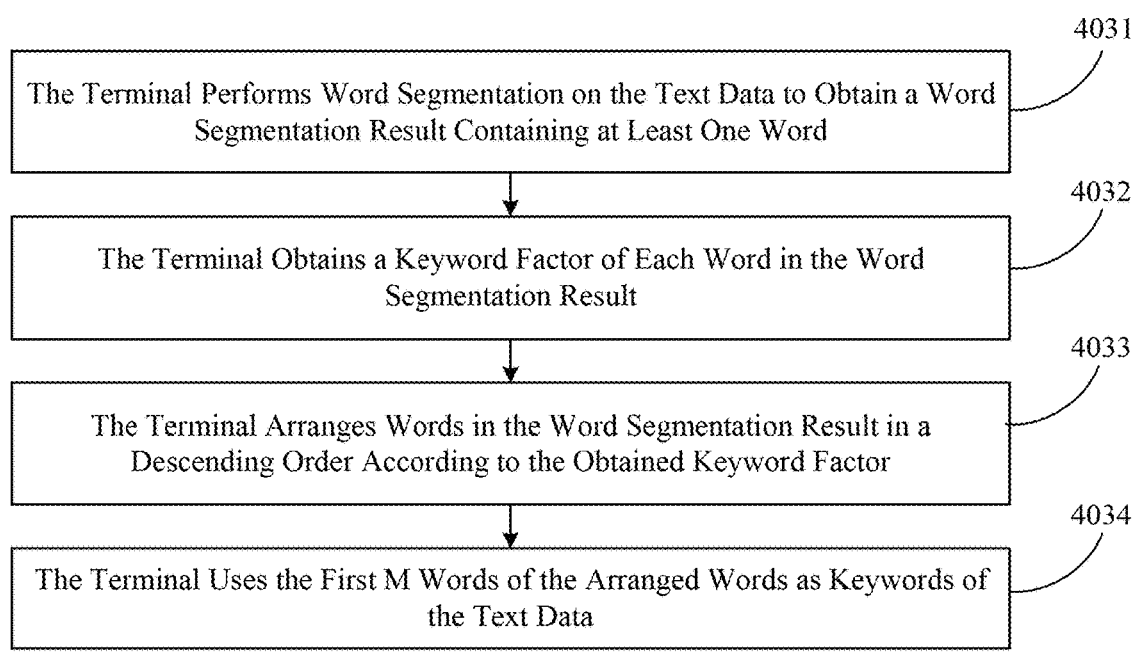
Figures 3, 4:
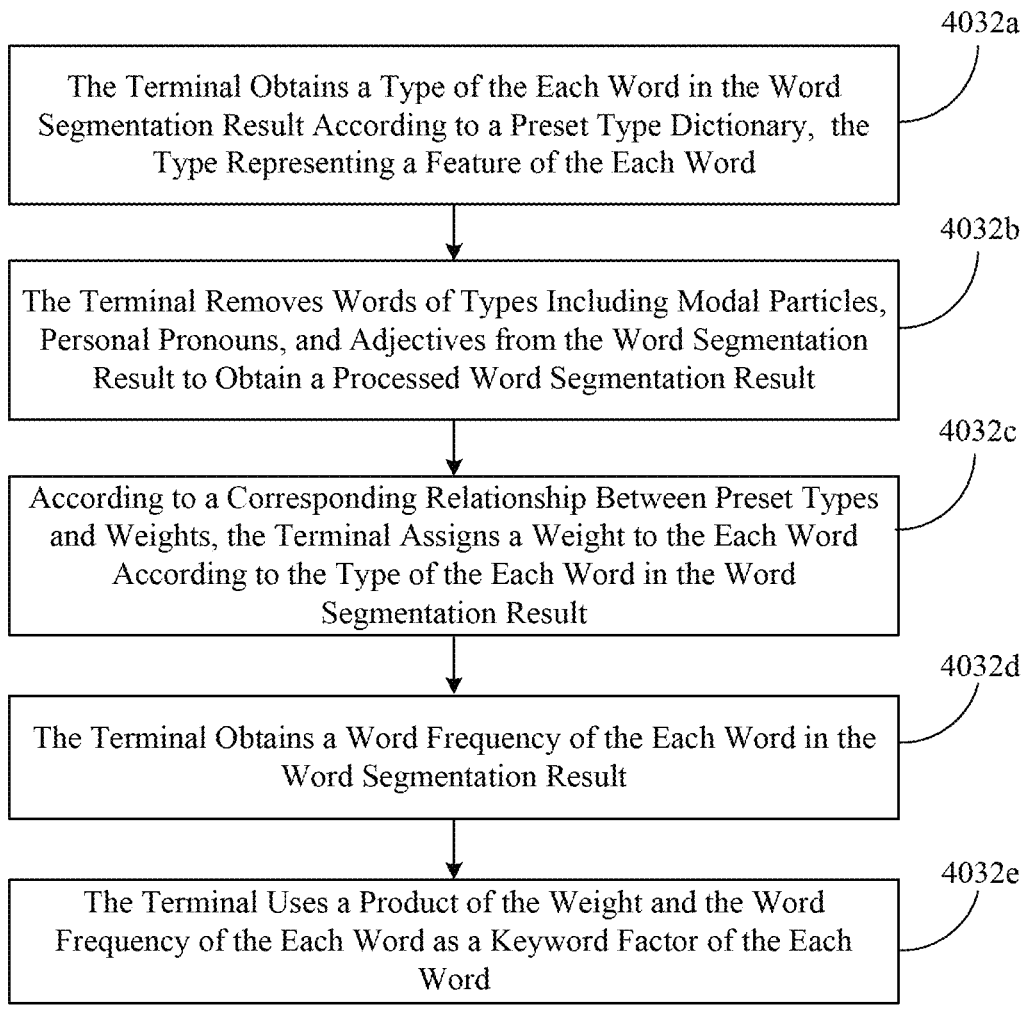
Figure 4:
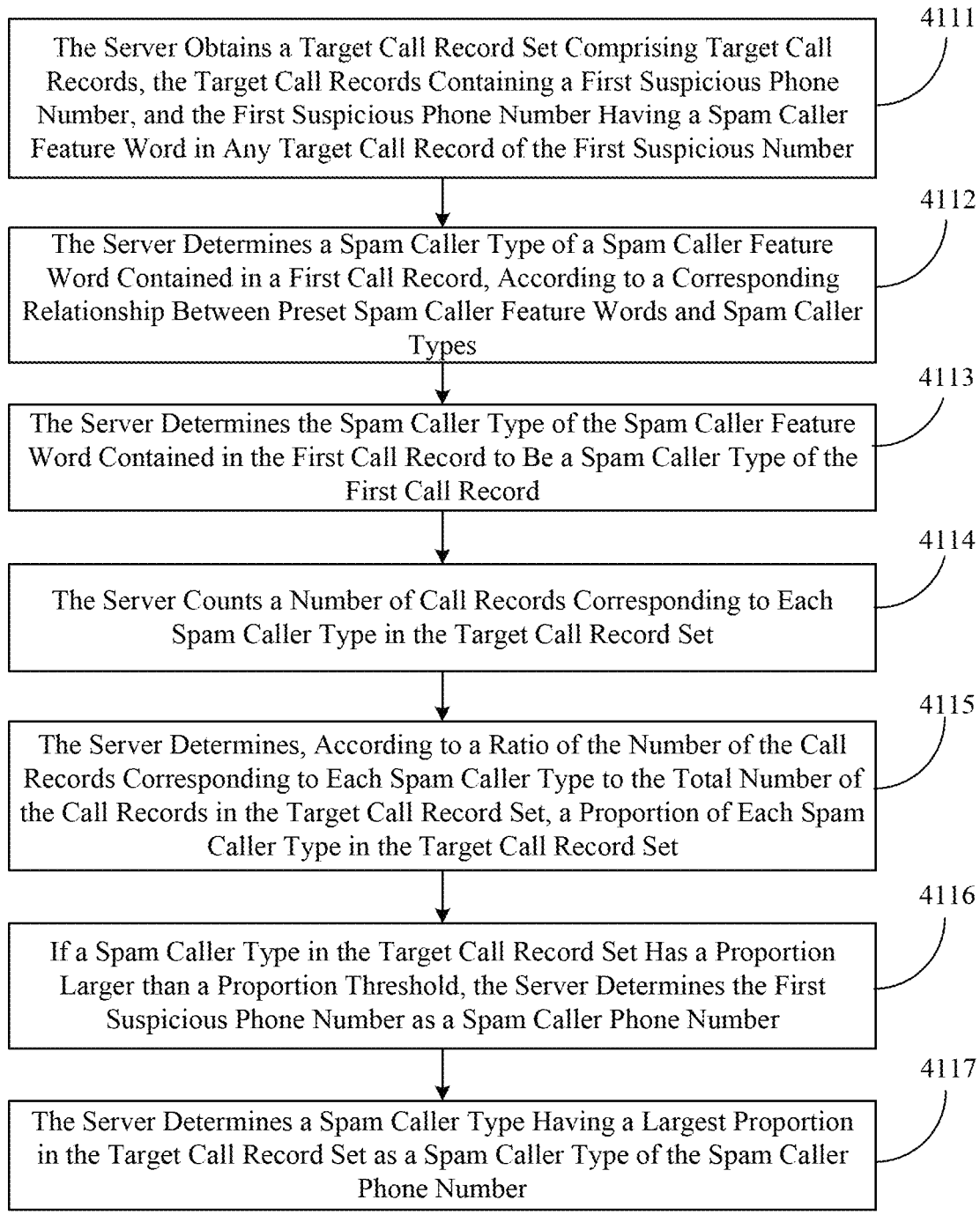

FIG. 4-1 is a flow chart illustrating a method for determining a spam caller phone number, according to an exemplary embodiment. The method may be implemented by the system 100 (FIG. 1), and include the following steps.

Step 401: the terminal obtains voice call data of a call made with an unknown number and a call record of the call, the call record containing the unknown number and the unknown number not being stored in a contact list of the terminal.

Each time when starting a call, the terminal may determine whether a phone number of a caller terminal is an unknown number according to a contact list of the terminal. When the phone number of the caller terminal is an unknown number, the terminal may obtain voice call data, for example, by synchronously recording the call, and may generate a corresponding call record. The call record may contain the unknown number of the caller terminal and a phone number of the terminal, or the call record may only contain the unknown number of the caller terminal.

Step 402: the terminal converts the voice call data into text data.

After obtaining the voice call data, the terminal may convert the voice call data into text data in a text format, and the text format may be .txt, American Standard Codes for Information Interchange (ASCII), and so on.

In one embodiment, the obtained voice call data may be converted into the text data by automatic speech recognition.

In one embodiment, step 402 and step 401 may be performed simultaneously. That is, a terminal obtains voice call data of a call between a terminal and the unknown number, and converts the voice data into text data in real time. In this way, the terminal may obtain complete text data of the call content when the call ends.

Step 403: the terminal obtains at least one keyword of the text data of the call content, the at least one keyword representing a call topic of the text data.

After obtaining the text data, the terminal may analyze the text data of the call content and may obtain a word representing the call topic. For example, the obtained text data may be a sentence about a discussion of a certain celebrity, and the keyword obtained by the terminal may be the name of the celebrity.

As shown in FIG. 4-2, the step 403 may include 4 sub-steps as follows.

Sub-step 4031: the terminal performs word segmentation on the text data to obtain a word segmentation result containing at least one word.

The text data obtained by the terminal may include a plurality of complete sentences, and the terminal may perform word segmentation on the text data to split the complete sentences into separate words or phrases to extract a keyword.

Methods of performing the word segmentation may include segmentation based on dictionary and word library matching, segmentation based on word frequency statistics, and segmentation based on knowledge, each of which may further include a plurality of word segmentation algorithms. For example, the segmentation based on dictionary and word library matching may include a forward maximum matching method, a reverse maximum matching method, a shortest path word segmentation method, and so on. For another example, the segmentation based on word frequency statistics may include an algorithm of establishing a statistics-based word segmentation model and then performing word segmentation according to the word segmentation model. In one embodiment, at least one word segmentation algorithm in the three word segmentation methods may be selected randomly to perform the word segmentation on the text data.

Sub-step 4032: the terminal obtains a keyword factor of each word in the word segmentation result.

After obtaining the word segmentation result of the text data, the terminal may obtain a keyword factor of each word in the word segmentation result. The keyword factor may positively scale with a correlation between the topic and the each word, and the correlation may indicate a correlativity between a word and the call topic of the text data. For example, the larger a keyword factor of a word is, the higher the correlativity of the word to the call topic of the text data is.

As shown in FIG. 4-3, the step 4032 may include 5 sub-steps as follows.

Sub-step 4032a: the terminal obtains a type of the each word in the word segmentation result according to a preset type dictionary, the type representing a feature of the each word.

After obtaining the word segmentation result of the text data, the terminal may obtain the type of the each word in the word segmentation result according to a preset type dictionary. The type may represent or indicate a feature of the each word. For example, the type may be spam caller feature word, proper noun, name of a person, date, modal particle, personal pronoun, adjective, or place name, and the preset dictionary may record the types of most commonly-used vocabularies.

Sub-step 4032b: the terminal removes words of types including modal particles, personal pronouns, and adjectives from the word segmentation result to obtain a processed word segmentation result.

After obtaining the type of the each word in the word segmentation result, the terminal may remove words of types of modal particles, personal pronouns, and adjectives to obtain a processed word segmentation result, reducing calculation in subsequent steps and improving the running speed of the terminal.

The words of the types such as modal particles, personal pronouns, and adjectives may usually be unrelated to the call topic, and may occur frequently. For example, the modal particles may include oh, ah, Hmmm, Wow, well, and so on; the personal pronouns may include you, I, he, and so on; and the adjectives may include large, high, serious, vivid, beautiful, and so on. The removal of these words may improve the accuracy of an obtained keyword without affecting subsequent acquisition of keywords. Further, the terminal may remove other types of words that are less correlated with the topic.

The sub-step 4032b may be optional. That is, the terminal may not perform the sub-step 4032b, and perform sub-step 4032c directly after performing sub-step 4032a.

Sub-step 4032c: according to a corresponding relationship between preset types and weights, the terminal assigns a weight to the each word according to the type of the each word in the word segmentation result.

After removing the words of the types unrelated to the call topic, the terminal may obtain a keyword factor of each word in the processed word segmentation result. According to the corresponding relationship between the preset types and the weights, the terminal may assign a weight to the each word according to the type of the each word in the word segmentation result, and the corresponding relationship may be preset according to possible correlativity between the types and the call topic. For example, a highest weight may be assigned to a word of a spam caller feature word type, a relatively high weight may be assigned to words of a proper noun type and a person name type, and a relatively low weight can be assigned to words of a date type and a place name type. For example, a weight corresponding to a spam caller feature word is 2, a weight corresponding to a proper noun and a name of a person is 1.5, and a weight corresponding to a date and a place name is 1, and so on.

Sub-step 4032d: the terminal obtains a word frequency of the each word in the word segmentation result.

After assigning the weight to the each word in the word segmentation result, the terminal may obtain the word frequency of the each word in the word segmentation result, and the word frequency may be the frequency of appearance of a certain word in the word segmentation result. For example, there are 100 words in the word segmentation result in total, and the word "real estate" appears for 12 times, so the word frequency of "real estate" in the word segmentation is 12. In one embodiment, the word frequency may represent a value obtained by dividing the frequency of appearance of a certain word in the word segmentation result by the total number of words in the word segmentation result. For example, there are 100 words in the word segmentation result in total, and the word "real estate" appears for 12 times, so the word frequency of "real estate" in the word segmentation may be 12/100=0.12. The word frequency of each word in each word segmentation result may be counted when word segmentation is performed by using a plurality of word segmentation algorithms to obtain the plurality of word segmentation results.

The sub-step 4032d may be performed before or simultaneously with the sub-step 4032c.

Sub-step 4032e: the terminal uses a product of the weight and the word frequency of the each word as a keyword factor of the each word.

After obtaining the weight and the frequency of the each word, the terminal may use the product of the weight and the frequency as a keyword factor.

Referring back to FIG. 4-2, sub-step 4033: the terminal arranges words in the word segmentation result in a descending order according to the obtained keyword factor.

After obtaining the keyword factor of the each word in the word segmentation result, the terminal may arrange words in the word segmentation result in a descending order according to sizes of the keyword factors. That is, a word having a larger key factor may rank higher.

The terminal may rank words in each word segmentation result respectively, or combine and rank words together, when performing the word segmentation through the word segmentation algorithms to obtain the word segmentation results.

Sub-step 4034: the terminal uses first M words of the arranged words as keywords of the text data.

The first M words may be the first M words in each word segmentation result, or the first M words may be the first M words in a combined ranking if the terminal performs the word segmentation through the word segmentation algorithms to obtain the word segmentation results. M may be a preset value.

For example, M is 1 and the terminal obtains two word segmentation results F1 and F2 according to two word segmentation algorithms F1 contains words "insurance," "see the house," and "congratulations," while a keyword factor of "insurance" is 10, a keyword factor of "see the house" is 12, and a keyword factor of "congratulations" is 8. F2 contains words "prize," "Zhang San," and "Li Si", while the keyword factor of "prize" is 13, the keyword factor of "Zhang San" is 7, and the keyword factor of "Li Si" is 3.

In one embodiment, the words in F1 are arranged in a descending order as follows according to the keyword factors: 1. see the house; 2. insurance; 3. congratulations, and the words in F2 are arranged in a descending order as follows according to the keyword factors: 1. prize; 2. Zhang San; 3. Li Si. The terminal may use the top-ranked words in these two rankings, "see the house" and "prize," as keywords.

In one embodiment, the words contained in F1 and F2 are combined and arranged in a descending order as follows according to the sizes of the keyword factors: 1. prize; 2. see the house; 3. insurance; 4. congratulations; 5. Zhang San; 6. Li Si. The terminal may also use the top-ranked "prize" in the combined ranking as a keyword.

The terminal may configure a keyword factor threshold. The terminal may use the keyword factor threshold to perform screening on the first M words, remove words having a keyword factor smaller than the keyword factor threshold from the first M words, and use the remaining words as keywords, thereby improving the accuracy of a finally determined keyword. In one embodiment, the terminal may directly use a word having a keyword factor larger than the keyword factor threshold in the word segmentation result as a keyword.

As described, keywords of the text data can be obtained. The step 402 and the step 403 may be implemented by the terminal to obtain the keywords. These two steps or corresponding sub-steps may also be implemented by the server. For example, the terminal may upload the voice call data or the text data to the server and, accordingly, the server may follow the described steps to obtain the keywords.

Referring back to FIG. 4-1, step 404: the terminal generates a target call record according to the obtained at least one keyword and the obtained call record, the target call record containing the unknown number and the at least one keyword.

After obtaining the keywords, the terminal may combine the keywords and the call record corresponding to the keywords to obtain a target call record. The target call record may contain the unknown number and the at least one keyword. For example, a keyword may be inserted into a corresponding field in the call record to generate the target call record.

Step 405: the terminal transmit all call records within a preset period of time to the server.

After obtaining target call records, the terminal may transmit all call records within a preset period of time to the server. The all call records may include the target call records and ordinary call records, and the ordinary call records do not include a keyword. For example, the terminal may monthly upload all call records in the corresponding month to the server.

Further, the terminal may only upload the target call records to the server.

Step 406: the server obtains all call records of at least one terminal within a preset period of time.

The server may obtain all call records of at least one terminal within a preset period of time. For example, the server may obtain all call records of 1000 terminals in a month, and the server may monthly obtain the call records of the 1000 terminals.

Step 407: the server obtains target call records from the call records of the at least one terminal within the period of time to obtain a call record set.

When the terminal provides all call records to the server, the server may obtain target call records through screening, and compile the target call records into a call record set. Screening methods may include the following based on different conditions.

1) when the terminal has transmitted a contact list to the server, the server may identify call records containing an unknown number, based on the contact list, and use these call records that contain an unknown number as target call records;

2) when the terminal has not transmitted a contact list to the server, and has only transmitted the call records to the server, the server may determine whether a name is recorded in a call record, and use a call record without a recorded name as a target call record. When generating a call record, and if the number of a caller terminal is the number of a contact recorded in a contact list, the terminal may record the name of the contact in the call record.

Further, the server may compile obtained target call records into a call record set, when the terminal only transmits the target call records to the server.

Step 408: the terminal removes a repeated call record from the call record set.

Besides an unknown number of a caller terminal, a target call record may further record a phone number of a terminal that generates the target call record. The removal of the repeated call record may include discarding call records of at least two call records of the same type to obtain a target call record with most keywords. That is, when there are a plurality of target call records of the same phone numbers, these target call records may be arranged in a descending order according to the number of contained keywords, and only the first-ranked target call record may be kept. The call records of the same type may be target call records containing two identical phone numbers, and the two numbers may be phone numbers of a caller and a receiver of the same call.

For example, when target call record A, target call record B, and target call record C are call records of the same type, target call record A contains keywords "insurance," "see the house," "congratulation," and "prize", target call record B contains a keyword "Zhang san," and target call record C contains keywords "Li Si" and "investment", these target call records can be arranged in a descending order according to the number of the contained keywords.

1. Target call record A (4 keywords).
2. Target call record C (2 keywords).
3. Target call record B (1 keyword).

The server may discard target call record C and target call record B, while keeping target call record A containing the most keywords, thereby improving the accuracy of determining a spam caller phone number.

Step 409: the server obtains N suspicious numbers in a processed call record set.

The N suspicious numbers are the first N unknown numbers among unknown numbers contained in a predetermined number of target call records and arranged according to frequencies of appearance in a descending order, and N can be a preset value.

Since a caller of spam caller calls may make the calls to a large number of phones, the number of the caller of the spam caller calls may appear in the target call records for many times. Accordingly, the server may count the frequency of appearance of each unknown number in the target call records contained in the call record set after removing the repeated call record from the call record set, arranging all unknown numbers in a descending sequence according to the frequencies of appearance, and determining the first N unknown numbers as suspicious numbers (e.g. N suspicious numbers in a processed call record set).

For example, the server obtains the frequencies of appearance of unknown numbers through statistics as follows: unknown number 1 appears for 1000 times, unknown number 2 appears for 900 times, unknown number 3 appears for 800 times, unknown number 4 appears for 1200 times, unknown number 5 appears for 2000 times, and these unknown numbers are arranged in a descending order according to the frequencies of appearance as follows.

1. Unknown number 5
2. Unknown number 4
3. Unknown number 1
4. Unknown number 2
5. Unknown number 3

When N is preset as 3, it may be obtained that suspicious numbers are unknown number 5, unknown number 4 and unknown number 1.

Further, the server may set a frequency threshold of appearance, filter out unknown numbers with a smaller frequency of appearance than the frequency threshold of appearance from the first N unknown numbers, and use the remaining unknown numbers as suspicious numbers, thereby improving the accuracy of determining the suspicious numbers. The server may use unknown numbers with a larger frequency of appearance than the frequency threshold of appearance in the call record set as suspicious numbers.

The server may also determine a suspicious number as a spam caller phone number.

Step 410: the server detects whether a spam caller feature word recorded in a preset dictionary exists in keywords contained in a target call record of each suspicious number.

After obtaining the suspicious numbers, the server may detect, according to a preset dictionary, whether a spam caller feature word exists in keywords contained in a target call record of each suspicious number, and the preset dictionary may record the spam caller feature words. For example, spam caller feature words recorded in the preset dictionary may include:

insurance, insurance company, insurance product, risk, investment;

second-hand house, see the house, school district house, owner, new house, change of house;

congratulations, mobile phone number, phone number, lucky draw, win a prize, prize.

The server may detect whether these words exist in keywords contained in a target call record of each suspicious number.

Step 411: if a spam caller feature word recorded in the preset dictionary exists in keywords contained in a target call record of any suspicious number, the server determines a suspicious number having the spam caller feature word in the target call record to be a spam caller phone number.

After determining whether a suspicious number has a spam caller feature word according to the preset dictionary, the server may determine a suspicious number having a spam caller feature word as a spam caller phone number. The present step may further improve the accuracy of determining a spam caller phone number, and reduce a chance of determining a normal number (a non-spam caller phone number) to be a spam caller number.

As shown in FIG. 4-4, the step 411 may include 7 sub-steps as follows.

Sub-step 4111: the server obtains a target call record set comprising target call records, the target call records containing a first suspicious phone number, and the first suspicious phone number having a spam caller feature word in any target call record of the first suspicious number.

After determining whether a spam caller feature word is contained in any target call records of all suspicious numbers, the server may obtain a target call record set comprising target call records, the target call records containing a first suspicious phone number, and the first suspicious phone number having a spam caller feature word in any target call record of the first suspicious number. The first suspicious number may appear in a plurality of target call records, and the server may compile the plurality of target call records into the target call record set.

Sub-step 4112: the server determines a spam caller type of a spam caller feature word contained in a first call record, according to a corresponding relationship between preset spam caller feature words and spam caller types.

The spam caller type may indicate a purpose of the first suspicious phone number, and the first call record may be any call record in the target call record set. That is, the server may determine a spam caller type of a spam caller feature word contained in each target call record in the target call record set according to the corresponding relationship between preset spam caller feature words and spam caller types. For example, the corresponding relationship between preset spam caller feature words and spam caller types may be as shown in Table 1:

TABLE 1

| Spam caller type | Spam caller feature word |
| --- | --- |
| Promotion | Insurance, insurance company, insurance product, risk, investment |
| Agent | Second-hand house, see the house, school district house, owner, new house, change of house |
| Fraud | Congratulations, mobile phone number, phone number, lucky draw, win a prize, prize |

In Table 1, the first row includes headers describing the two columns in Table 1. The left column includes spam caller types, and the right column includes spam caller feature words corresponding to each spam caller type. The server may determine a spam caller type of the spam caller feature word contained in a first call record according to the table. For example, a spam caller feature word contained in the first call record is "congratulations", it may be determined from Table 1 that the spam caller type of "congratulations" is a "fraud".

Sub-step 4113: The server determines the spam caller type of the spam caller feature word contained in the first call record to be a spam caller type of the first call record.

After obtaining a spam caller type of a spam caller feature word contained in each call record in the target call record set, the server may determine the spam caller type of the spam caller feature word as a spam caller type of the call record. For example, if a call record in the target call record set contains a spam caller feature word in the type of "fraud", the server may determine a spam caller type of the call record as a "fraud".

When a call record in the target call record set contains a plurality of spam caller types of spam caller feature words, the plurality of spam caller types may be determined as spam caller types of the call record. For example, call record A contains two spam caller types of spam caller feature words "fraud" and "agent", and spam caller types of call record A include "fraud" and "agent".

Sub-step 4114: The server counts a number of call records corresponding to each spam caller type in the target call record set.

After obtaining a spam caller type of each call record in the target call record set, the server may count the number of call records corresponding to each spam caller type in the target call record set.

For example, spam caller types of call record A include "fraud" and "agent", the spam caller type of call record B is "promotion", and the spam caller type of call record C is "agent", then a counting result of the server is as follows:

The spam caller type "agent" corresponds to two call records, call record A and call record C, the spam caller type "fraud" corresponds to one call record which is call record A, and the spam caller type "promotion" corresponds to one call record which is call record B.

Sub-step 4115: The server determines, according to a ratio of the number of the call records corresponding to each spam caller type to the total number of the call records in the target call record set, a proportion of each spam caller type in the target call record set.

After counting the number of call records corresponding to each spam caller type in the target call record set, the server may determine, according to the ratio of the number of the call records corresponding to each spam caller type to the total number of the call records in the target call record set, the proportion of each spam caller type in the target call record set.

For example, if the spam caller type "promotion" in the target call record set corresponds to 60 call records, the spam caller type "agent" corresponds to 20 call records, and there are 100 call records in the target call record set in total, the proportion of the spam caller type "promotion" in the target call record set is 0.6, and the proportion of the spam caller type "agent" in the target call record set is 0.2.

Step 4116: If a spam caller type in the target call record set has a proportion larger than a proportion threshold, the server determines the first suspicious phone number as a spam caller phone number.

After obtaining the proportions of the spam caller types in the target call record set, the server may determine whether any of the proportions is larger than the proportion threshold, and if so, determine the first suspicious phone number as a spam caller phone number. For example, if the proportion threshold is 0.5, and a proportion of the spam caller type "promotion" in the target call record set is 0.6 which is larger than the proportion threshold, the first suspicious phone number corresponding to the target call record set may be determined as a spam caller phone number.

Since spam calls may have the same content, spam caller types of spam caller feature words in a plurality of call records of a spam caller phone number may be highly similar. That is, a suspicious number may be screened out according to the proportion threshold, thereby further improving the accuracy of determining a spam caller phone number.

Sub-step 4117: the server determines a spam caller type having a largest proportion in the target call record set as a spam caller type of the spam caller phone number.

After determining the spam caller phone number, the server may determine a spam caller type having the largest proportion in the target call record set corresponding to the spam caller phone number as a spam caller type of the spam caller phone number. The spam caller type may enable a user to recognize the spam caller phone number clearly, thereby improving user experience. For example, if the target call record set contains call records of two spam caller types "promotion" and "agent", while a proportion of the spam caller type "promotion" in the target call record set is 0.6, and that of the spam caller type "agent" in the target call record set is 0.2, it may be determined that the spam caller type of the spam caller phone number is "promotion".

Further, sub-step 4117, as a step for classifying spam caller phone numbers, may be optional.

All call records in the target call record set may be target call records.

Referring back to FIG. 4-1, in step 412: the server generates an instant spam caller number list according to the determined spam caller phone numbers.

After obtaining spam caller phone numbers, the server may generate an instant spam caller number list according to the spam caller phone numbers. For example, the generated instant spam caller number list may be as shown in Table 2.

TABLE 2

| Spam caller phone number |
| --- |
| 111***1111 |
| 111***1112 |
| 111***1113 |
| ... |

In Table 2, the first row is a header describing data in Table 2, and the numbers in Table 2 represents spam caller phone numbers.

The server may further generate an instant spam caller number list according to both the spam caller phone numbers and spam caller types, when determining the spam caller types of the spam caller phone numbers. That is, the instant spam caller number list may not only record the spam caller phone numbers, but also record the spam caller types of the spam caller phone numbers, as shown in FIG. 3, as an example.

TABLE 3

| Spam caller phone number | Spam caller type |
| --- | --- |
| 111***1111 | Promotion |
| 111***1112 | Agent |
| 111***1113 | Fraud |
| ... | ... |

In Table 3, the first row includes headers describing the data of the two columns of Table 3, the left column includes the spam caller phone numbers, and the right column includes the spam caller type of each spam caller phone number. For example, the spam caller type corresponding to the spam caller phone number "111***1111" is "promotion".

Step 413: the server updates a history spam caller number list according to the instant spam caller number list.

After obtaining the instant spam caller number list, the server may update a history spam caller number list according to the instant spam caller number list, and the history spam caller number list may be generated according to a previous instant spam caller number list obtained by the server. Further, if an instant spam caller number list is obtained for the first time, the instant spam caller number list may be used as a history spam caller number list. When the history spam caller number list is updated, a timestamp may be attached to each spam caller phone number to indicate a time when the spam caller phone number is recorded in the history spam caller number list. The server may generate an instant spam caller number list at various time intervals, and update a history spam caller number list according to a latest instant spam caller number list.

The timestamp, or known as Unix time, may represent a time, and can be defined as a total number of seconds from Greenwich mean time 00:00:00, Jan. 1, 1970 (Beijing time: 08: 00:00, Jan. 1, 1970) until now.

The history spam caller number list may be updated according to three principles as follows.

1) A spam caller phone number not in the history spam caller number list, but included in the instant spam caller number list, is updated in the history spam caller number list.

2) If a spam caller phone number is in the history spam caller number list and the instant spam caller number list, a timestamp of the spam caller phone number in the history spam caller number list is updated.

3) If a spam caller phone number is in the history spam caller number list, but is not in the instant spam caller number list, a current time is compared with a timestamp of the spam caller phone number. If a time difference is larger than a threshold (which may be preset), the spam caller phone number in the history spam caller number list is deleted. Deleting the spam caller phone number that has not been used for a long period of time from the history spam caller number list can prevent misinterpretations when callers of the spam number change.

After the present step, spam caller phone numbers recorded in the history spam caller number list obtained by the server will be highly accurate.

Step 414: the server transmits the updated history spam caller number list to the terminal After updating the history spam caller number list, the server may transmit the updated history spam caller number list to the terminal. For example, the sever may transmit the updated history spam caller number list to the terminal, or the terminal may download the updated history spam caller number list from the server.

After obtaining the updated history spam caller number list, a user of the terminal may process a call from a spam caller phone number according to the spam caller phone numbers and the spam caller types of the spam caller phone numbers recorded.

A method for determining a spam caller phone number according to an embodiment of the present disclosure may determine whether a word in a word segmentation result is a keyword according to the size of a keyword factor, thereby improving the accuracy of a keyword.

A method for determining a spam caller phone number according to an embodiment of the present disclosure may determine N numbers having the highest frequencies of appearance in a target call record as suspicious numbers, thereby improving the accuracy of determining a spam caller phone number.

A method for determining a spam caller phone number according to an embodiment of the present disclosure may screen out a spam caller phone number according to the proportion of target call records corresponding to each spam caller type in a target call record set in the target call record set, thereby further increasing the accuracy of determining a spam caller phone number.

In the method for determining a spam caller phone number according to an embodiment of the present disclosure, N unknown numbers with the highest frequencies of appearance in a call record set can be determined to be suspicious numbers, and a suspicious number having a spam caller feature word in keywords contained in a target call record of the suspicious number can be determined to be a spam caller phone number, the keywords representing a call topic. Thus, a spam caller phone number among a large number of phone numbers in the call record set can be determined conveniently and rapidly, improving the efficiency in obtaining the spam caller phone number.

Figures 1, 5:
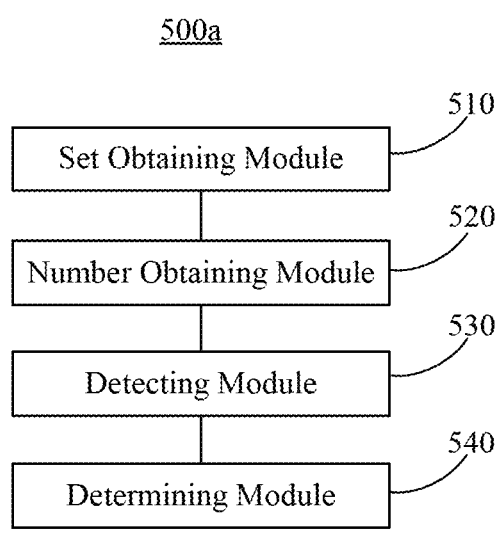
Figures 2, 5:
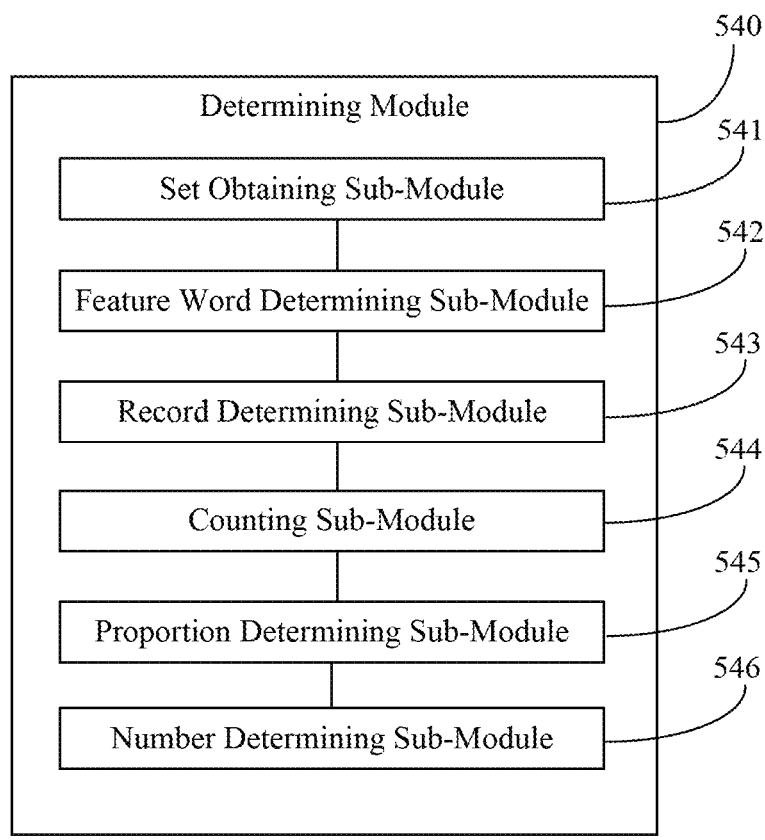
Figures 3, 5:
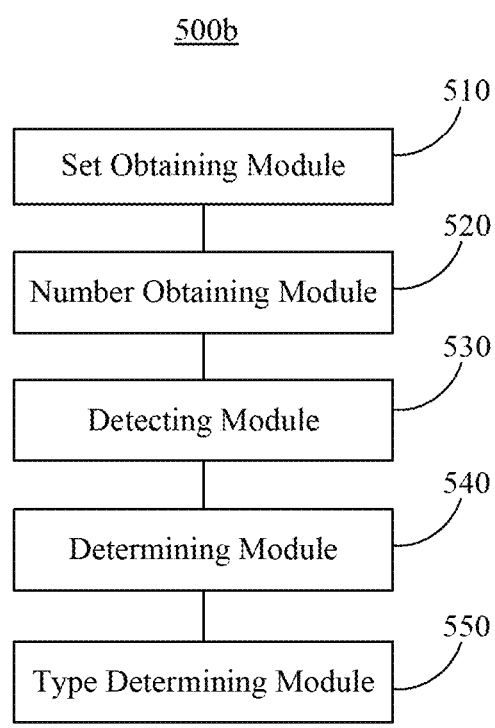

The followings are embodiments of devices for executing methods described above. FIG. 5-1 is a block diagram illustrating a device 500a for determining a spam caller phone number, according to an exemplary embodiment. The device 500a may be a part of the server 12 shown in FIG. 1. The device 500a may include: a set obtaining module 510, a number obtaining module 520, a detecting module 530, and a determining module 540.

The set obtaining module 510 is configured to obtain a target call record from a terminal, the target call record forming a call record set, the call record set containing a predetermined number of target call records, where each of the target call records may contain an unknown number and at least one keyword, the at least one keyword may be obtained by the terminal according to contents of a call, for example, text data of the call, made with the unknown number, and may represent a topic of the contents, and the unknown number may be a number not stored in a contact list of the terminal.

The number obtaining module 520 is configured to obtain N suspicious numbers in the call record set, wherein the N suspicious numbers are first N unknown numbers of the highest frequencies of appearance and correspond to the predetermined number of target call records;

The detecting module 530 is configured to determine whether a spam caller feature word recorded in a preset dictionary exists in keywords contained in the target call record of a suspicious number.

The determining module 540 is configured to determine, if a spam caller feature word recorded in the preset dictionary exists in keywords contained in the target call record of a suspicious number, the suspicious number to be a spam caller phone number.

As described, the device for determining a spam caller phone number may determine N unknown numbers with the highest frequencies of appearance in a call record set as suspicious numbers, and further determine a suspicious number having a spam caller feature word in keywords contained in a target call record of the suspicious number as a spam caller phone number, the keywords representing a call topic. Thus, a spam caller phone number among a large number of phone numbers in the call record set can be determined conveniently and rapidly, improving the efficiency in obtaining the spam caller phone number.

FIG. 5-2 is a block diagram illustrating the determining module 540 in the device for determining a spam caller phone number, according to an exemplary embodiment.

The determining 540 module may include:

a set obtaining sub-module 541 configured to obtain a target call record set comprising target call records, the target call records containing a first suspicious phone number, and the first suspicious phone number having a spam caller feature word in any target call record of the first suspicious number;

a feature word determining sub-module 542 configured to determine a spam caller type of a spam caller feature word contained in a first call record in the target call record set obtained by the set obtaining sub-module 541, according to a corresponding relationship between preset spam caller feature words and spam caller types, the spam caller type indicating a purpose of a spam call of the first suspicious phone number, and the first call record being any call record in the target call record set;

a record determining sub-module 543 configured to determine the spam caller type of the spam caller feature word contained in the first call record, determined by the feature word determining sub-module 542, to be a spam caller type of the first call record;

a counting sub-module 544 configured to count the number of call records corresponding to each spam caller type in the target call record set determined by the record determining sub-module 543;

a proportion determining sub-module 545 configured to determine the proportion of each spam caller type in the target call record set, according to the ratio of the number of the call records, counted by the counting sub-module 544, corresponding to each spam caller type to the total number of the call records in the target call record set; and a number determining sub-module 546 configured to determine, when a spam caller type has a proportion, determined by the determining sub-module 545, larger than a proportion threshold, the first suspicious phone number as a spam caller phone number.

FIG. 5-3 shows a block diagram illustrating a device 500b for determining a spam caller phone number, according to an embodiment of the present disclosure.

The device 500b may further include a type determining module 550 configured to determine a spam caller type having a largest proportion, which is determined by the proportion determining sub-module 545, in the target call record set as a spam caller type of the spam caller phone number.

In one embodiment, each of the target call records may contain two phone numbers, and the two phone numbers may contain an unknown number.

The number obtaining module 520 may be configured to remove a repeated call record from the call record set obtained by the set obtaining module 510. The removal of the repeated call record may include discarding call records of at least two call records of the same type to obtain a target call record with most keywords, and the call records of the same type are target call records containing two identical phone numbers. The number obtaining module 520 may also be configured to obtain N suspicious numbers in the processed call record set.

The device for determining a spam caller phone number may determine N numbers having the highest frequencies of appearance in a target call record as suspicious numbers, thereby improving the accuracy of determining a spam caller phone number.

The device for determining a spam caller phone number may screen out a spam caller phone number according to the proportion of target call records corresponding to each spam caller type in a target call record set in the target call record set, thereby further increasing the accuracy of determining a spam caller phone number.

As described, the device for determining a spam caller phone number may determine N unknown numbers with the highest frequencies of appearance in a call record set as suspicious numbers, and further determine a suspicious number having a spam caller feature word in keywords contained in a target call record of the suspicious number as a spam caller phone number, the keywords being words representing a call topic. Thus, a spam caller phone number in a large number of phone numbers in the call record set can be determined conveniently and rapidly, improving the efficiency in obtaining the spam caller phone number.

Figures 1, 6:
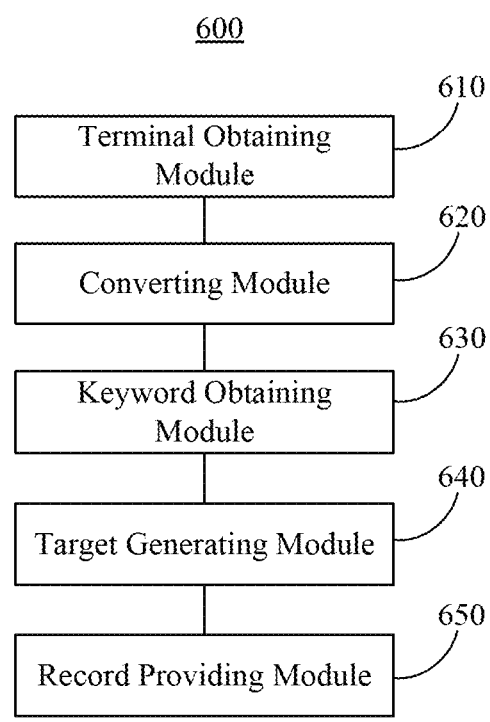
Figures 2, 6:
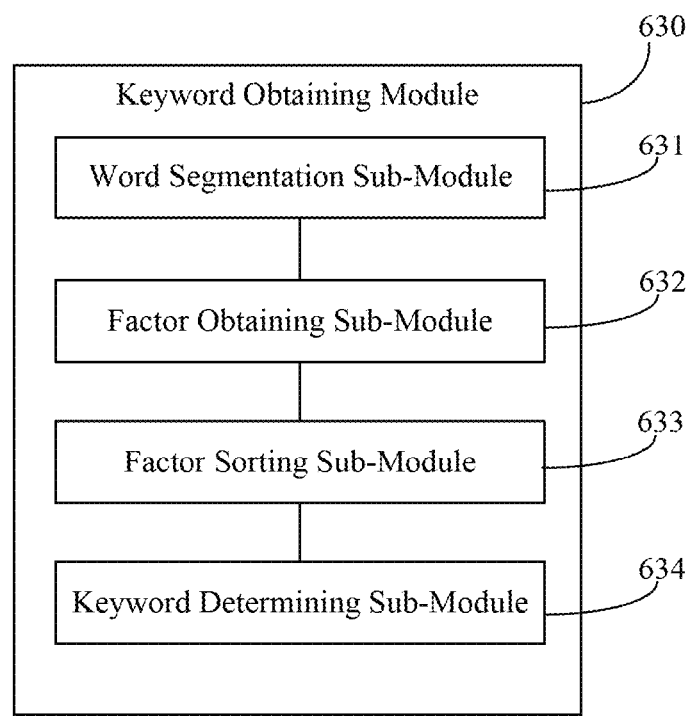

FIG. 6-1 is a block diagram illustrating a device 600 for determining a spam caller phone number, according to an exemplary embodiment. The device 600 may be the terminal 11 (FIG. 1). The device 600 may include:

a terminal obtaining module 610 configured to obtain voice call data of a call made with an unknown number and a call record of the call, the call record containing the unknown number and the unknown number being a number not stored in a contact list of the terminal 11;

a converting module 620 configured to convert the voice call data obtained by the terminal obtaining module 610 into text data;

a keyword obtaining module 630 configured to obtain at least one keyword of the text data converted by the converting module 620, the at least one keyword representing a call topic of the text data;

a target generating module 640 configured to generate a target call record according to the at least one keyword obtained by the keyword obtaining module 630 and the call record, the target call record containing the unknown number and the at least one keyword;

a record providing module 650 configured to transmit the target call record generated by the target generating module 640 to a server, the server being configured to determine whether the unknown number is a spam caller phone number according to the unknown number and the at least one keyword.

As described, the spam caller phone number determining device may obtain a target call record containing an unknown number and at least one keyword, and transmit the target call record to a server configured to determine whether the unknown number is a spam caller phone number according to the unknown number and the at least one keyword in the target call record, thereby improving the efficiency in obtaining a spam caller phone number.

FIG. 6-2 is a block diagram illustrating the keyword obtaining module 630 in the spam caller phone number determining device, according to an exemplary embodiment. The keyword obtaining module 630 includes:

a word segmentation sub-module 631 configured to perform word segmentation on the text data of the content to obtain a word segmentation result containing at least one word;

a factor obtaining sub-module 632 configured to obtain a keyword factor of each word in the word segmentation result obtained by the word segmentation sub-module 631, where the keyword factor may have positively scale with a correlation between the topic and the each word, and the correlation may indicate a correlativity between a word and the call topic of the text data;

a factor sorting sub-module 633 configured to arrange words in the word segmentation result in a descending order according to the keyword factor obtained by the factor obtaining sub-module 632; and a keyword determining sub-module 634 configured to use the first M words arranged by the factor sorting sub-module 633 as keywords of the text data.

In one embodiment, the factor obtaining sub-module 632 may be configured to obtain the type of the each word in word segmentation result, obtained by the word segmentation sub-module 631, according to a preset type dictionary, the type being for representing a feature of the each word; according to a corresponding relationship between preset types and weights, assign a weight for the each word according to the type of the each word in the word segmentation result; obtain a word frequency of the each word in the word segmentation result; and use a product of the weight and the word frequency of the each word as the keyword factor of the each word.

In one embodiment, the factor obtaining sub-module 632 may be configured to remove words of types of modal particles, personal pronouns, and adjectives from the word segmentation result obtained by the word segmentation sub-module 631 to obtain a processed word segmentation result; and obtain a keyword factor of each word in the processed word segmentation result.

The spam caller phone number determining device may determine whether a word in a word segmentation result is a keyword according to the size of a keyword factor, thereby improving the accuracy of a keyword.

As described, the spam caller phone number determining device may obtain a target call record containing an unknown number and at least one keyword, and provide the target call record to a server configured to determine whether the unknown number is a spam caller phone number according to the unknown number and the at least one keyword in the target call record, thereby improving the efficiency in obtaining a spam caller phone number.

The spam caller phone number determining device as shown in FIG. 6-1 may be configured to execute the method described above with reference to FIG. 3.

The keyword obtaining module as shown in FIG. 6-2 may be configured to execute the method described above with reference to FIG. 4-2.

Figure 7:
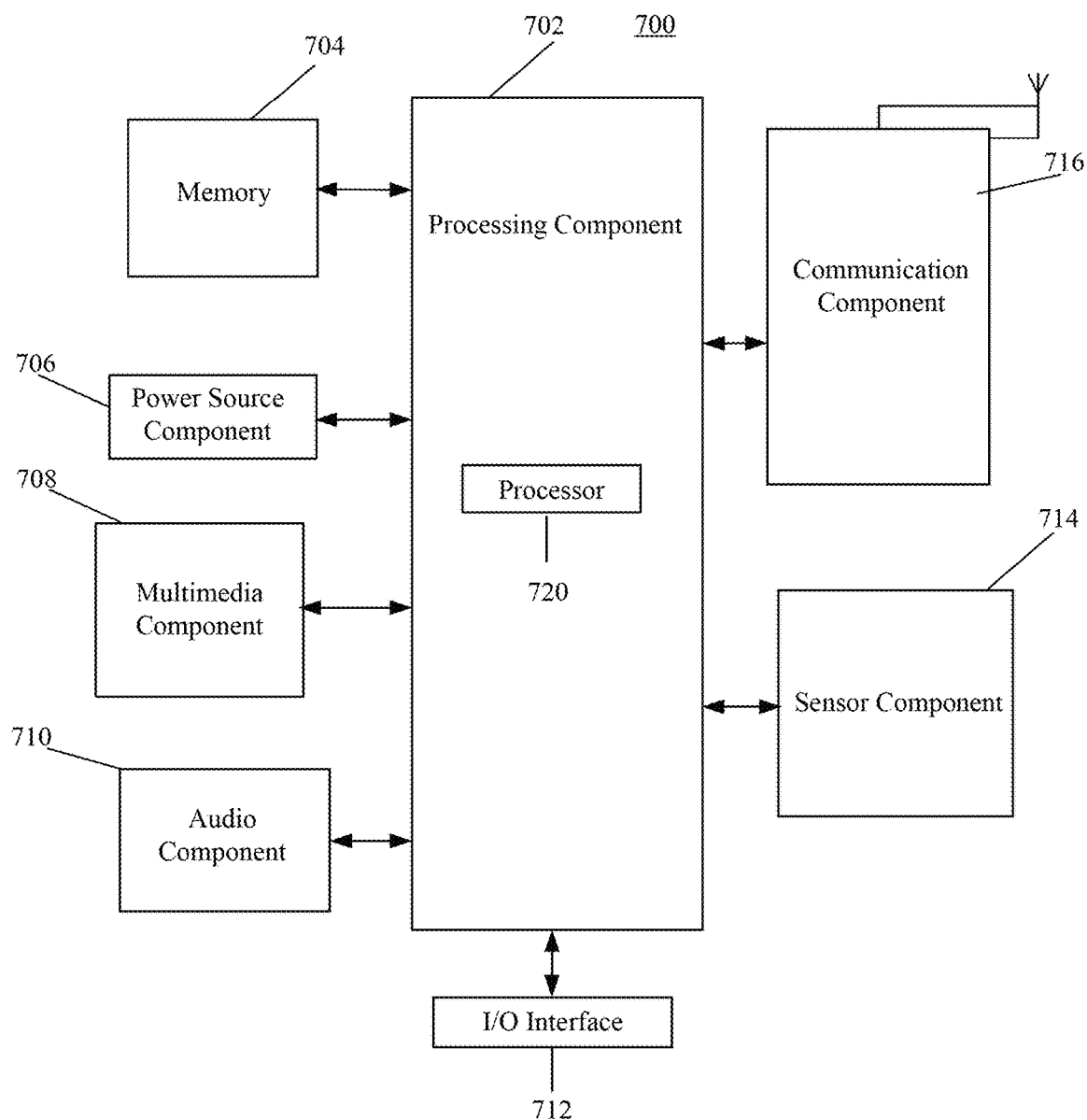
FIG. 7 is a block diagram illustrating a device for determining a spam caller phone number, according to an exemplary embodiment.

FIG. 7 is a block diagram illustrating a device 700 for determining a spam caller phone number, according to an exemplary embodiment. For example, the device 700 may be a mobile phone, a computer, a digital broadcasting terminal, a message transceiver, a game console, a tablet device, a medical device, a fitness device, a personal digital assistant, and so on.

Referring to FIG. 7, the device 700 may include one or more of the following components: a processing component 702, a memory 704, a power source component 706, a multimedia component 708, an audio component 710, an Input/Output (I/O) interface 712, a sensor component 714, and a communication component 716.

The processing component 702 controls overall operations of the device 700, such as operations associated with display, a telephone call, data communication, a camera operation and a recording operation. The processing component 702 may include one or more processors 720 to execute instructions so as to complete all or part of the steps of the method. Besides, the processing component 702 may include one or more modules, so as to process interaction between the processing component 702 and other components. For example, the processing component 702 may include a multimedia module so as to facilitate interaction between the multimedia component 708 and the processing component 702.

The memory 704 may be configured to store various types of data so as to support operations in the device 700. Examples of these data include an instruction of any application or method operated on the device 700, contact data, data of a telephone directory, a message, a picture, a video and so on. The memory 704 may be implemented by a volatile or non-volatile storage device of any type or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power source component 706 may provide power for various components of the device 700. The power source component 706 may include a power source management system, one or more power sources, and other components associated with power generation, management and distribution of the device 700.

The multimedia component 708 may include a screen providing an output interface between the device 700 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors so as to sense a touch, a slide, and a gesture on the TP. The touch sensor may not only sense a touch or a boundary of a slide, but also detect a duration and a pressure related to the touch or the slide. In some embodiments, the multimedia component 708 includes a front camera and/or a rear camera. When the device 700 is in an operation mode, such as a camera mode or a video mode, the front camera and/or the rear camera may receive external multimedia data. Each front camera and each rear camera may be a fixed optical lens system or may be provided with a focal distance or an optical zooming capability.

The audio component 710 may be configured to output and/or input an audio signal. For example, the audio component 710 includes a Microphone (MIC). When the device 700 is in an operation mode, such as a calling mode, a recording mode and a voice recognition mode, the MIC may be configured to receive an external audio signal. The received audio signal may be further stored in the memory 704 or sent by the communication component 716. In some embodiments, the audio component 710 may further include a loudspeaker configured to output the audio signal.

The I/O interface 712 provides an interface between the processing component 702 and a peripheral interface module. The peripheral interface module may be a keyboard, a click wheel, a button and so on. These buttons may include, but are not limited to a homepage button, a volume button, a start button and a lock button.

The sensor component 714 may include one or more sensors configured to provide evaluation of states of various aspects for the device 700. For example, the sensor component 714 may detect an on/off state of the device 700, and the relative locations of the components. For example, the components are a display and a keypad of the device 700. The sensor component 714 may further detect a change of the location of the device 700 or a change of the location of a component of the device 700, the existence of a contact between the user and the device 700, the position or acceleration/deceleration of the device 700 and a change in the temperature of the device 700. The sensor component 714 may include a proximity sensor configured to detect the existence of a nearby object when there is no any physical contact. The sensor component 714 may further include an optical sensor, such as a Complementary Metal Oxide Semiconductor (CMOS) or Charge Coupled Device (CCD) image sensor used in an imaging application. In some embodiments, the sensor component 714 may further include an acceleration sensor, a gyro sensor, a magnetic sensor, a pressure sensor, or a temperature sensor.

The communication component 716 may be configured to facilitate wired or wireless communication between the device 700 and other devices. The device 700 may access a wireless network based on a communication standard, such as Wireless Fidelity (WiFi), the second Generation (2G) or the third Generation (3G), or a combination thereof. In an exemplary embodiment, the communication component 716 may receive a broadcast signal from an external broadcast management system or broadcast related information through a broadcast channel In an exemplary embodiment, the communication component 716 may further include a Near Field Communication (NFC) module so as to promote short distance communication. For example, the NFC module may be implemented based on a Radio-frequency Identification (RFID) technology, an Infrared Data Association (IrDA) technology, an Ultra Wide Band (UWB) technology, a Bluetooth (BT) technology, and other technologies.

In an exemplary embodiment, the device 700 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic components, so as to execute the method above.

A non-temporary computer readable storage medium including instructions is further provided in an exemplary embodiment, such as a memory 704 including instructions. The instructions may be executed by the processor 720 of the device 700 so as to perform the methods described above. For example, the non-temporary computer readable storage medium may be a ROM, a Random-Access Memory (RAM), a Compact Disc-ROM (CD-ROM), a magnetic tape, a floppy disk, an optical data memory, and so on.

The non-temporary computer-readable storage medium may enable a device to execute a spam caller phone number determining method provided by each embodiment above, when instructions in the storage medium are executed by a processor of the device.

Figure 8:
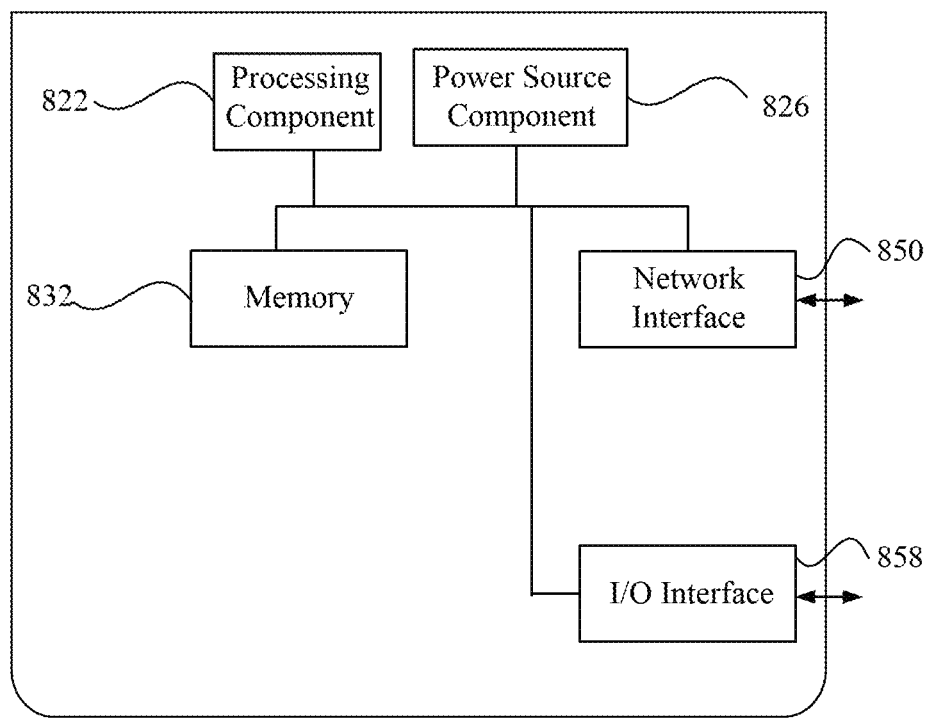
FIG. 8 if a block diagram illustrating a device for determining a spam caller phone number, according to an exemplary embodiment.

FIG. 8 is a block diagram illustrating a device 800 for determining a spam caller phone number, according to an exemplary embodiment. For example, the device 800 may be a server. Referring to FIG. 8, the device 800 may include a processing component 822, which further includes one or more processors, and a memory resource represented by a memory 832 and configured to store instructions executable by the processing component 822, such as an application. The application stored in the memory 832 may include one or more modules, each of which corresponds to a group of instructions. Further, the processing component 822 may be configured to execute instructions to perform the spam caller phone number determining methods described above.

The device 800 may further include a power source component 826 configured to execute power source management of the device 800, a wired or wireless network interface 850 configured to connect the device 800 to a network, and an I/O interface 858. The device may be operated based an operating system stored in the memory 832, such as Windows Server™, Mac OS X™, Unix™, Linux™, FreeBSD™ and the like.

Figure 9:
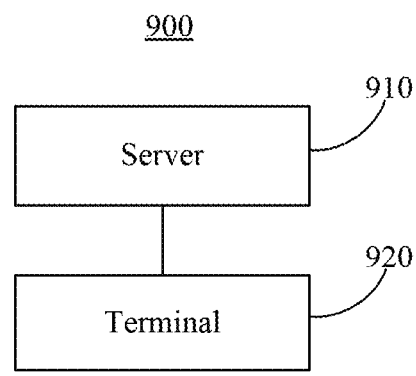
FIG. 9 is a block diagram illustrating a system for determining a spam caller phone number, according to an exemplary embodiment.

FIG. 9 is a block diagram illustrating a system 900 for determining a spam caller phone number, according to an exemplary embodiment. The system 900 may include a server 910 and a terminal 920.

The server 910 may include the spam caller phone number determining device described above with reference to FIG. 5-1 or the spam caller phone number determining device described above with reference to FIG. 5-3.

The terminal 920 may include the spam caller phone number determining device described above with reference to FIG. 6-1.

Figure 10:
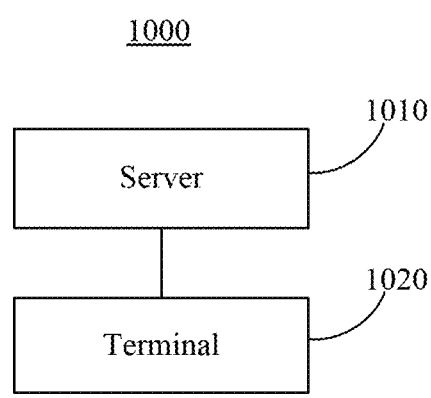
FIG. 10 is a block diagram illustrating a system for determining a spam caller phone number, according to an exemplary embodiment.

FIG. 10 is a block diagram illustrating a system 1000 for determining a spam caller phone number according to an exemplary embodiment. The system may include a server 1010 and a terminal 1020.

The server 1010 may include the spam caller phone number determining device described above with reference to FIG. 8.

The terminal 1020 may include the spam caller phone number determining device described above with reference to FIG. 7.

Those skilled in the art will understand that the above-described modules can each be implemented by hardware, or software, or a combination of hardware and software. Those skilled in the art will also understand that multiple ones of the above-described modules may be combined as one module, and each of the above-described modules may be further divided into a plurality of sub-modules.

Those skilled in the art will easily think of other embodiments of the present disclosure after considering the specification and practicing the embodiments of the present disclosure disclosed herein. The application aims to cover any variations, uses or adaptive changes of the embodiments of the present disclosure. These variations, uses or adaptive changes follow general principles of the embodiments of the present disclosure and include common general knowledge or conventional technical means in the art which are not described in the embodiments of the present disclosure. The specification and embodiments are only considered exemplary, and the true scope and spirit of the embodiments of the present disclosure will be indicated by the following claims.

It is to be understood that the embodiments of the present disclosure are not limited to the precise structures that have been described above or illustrated in the accompanying drawings, and various modifications and changes may be made without departing from the scope of the embodiments of the present disclosure. The scope of the embodiments of the present disclosure is limited by the appended claims.

What is claimed is:

1. A method for determining a spam caller phone number, implemented by a server, comprising:
    obtaining, by the server, at least one target call record from at least one terminal, wherein:
        the at least one target call record forms a call record set,
        the call record set contains a predetermined number of target call records,
        each of the target call records contains an unknown number and at least one keyword,
        the at least one keyword is obtained, by the at least one terminal, according to text data of a call with the unknown number,
        the at least one keyword represents a call topic of the text data, and
        the unknown number is a number not stored in a contact list of the terminal;
    obtaining, by the server, N suspicious numbers in the call record set, wherein the N suspicious numbers are first N unknown numbers in the predetermined number of target call records that have the highest frequencies of appearance;
    determining, by the server, whether a spam caller feature word recorded in a preset dictionary exists in keywords contained in a target call record of each suspicious number; and
    if a spam caller feature word recorded in the preset dictionary exists in keywords contained in the target call record of a suspicious number, determining, by the server, the suspicious number to be a spam caller phone number;
    wherein determining the suspicious number to be a spam caller phone number comprises:
        obtaining a target call record set formed by target call records containing a first suspicious phone number, the first suspicious phone number having a spam caller feature word in any target call record corresponding to the first suspicious number;
        determining a spam caller type of the spam caller feature word according to a corresponding relationship between preset spam caller feature words and spam caller types, the spam caller type indicating a purpose of a spam call corresponding to the first suspicious phone number and the first call record being any call record in the target call record set;
        determining the spam caller type of the spam caller feature word in the first call record to be a spam caller type of the first call record;
        counting a number of call records corresponding to each spam caller type in the target call record set;
        according to a ratio of the number of the call records corresponding to the each spam caller type to a total number of call records in the target call record set, determining a proportion of the each spam caller type in the target call record set; and
        if a spam caller type has a proportion larger than a proportion threshold, determining the first suspicious phone number as a spam caller phone number.

2. The method according to claim 1, further comprising: determining a spam caller type having a largest proportion in the target call record set as a spam caller type of the spam caller phone number.

3. The method according to claim 1, wherein:
    each of the target call records contains two phone numbers;
    the two phone numbers contain an unknown number; and
    obtaining the N suspicious numbers comprises:
        removing a repeated call record from the call record set, by discarding call records of at least two call records of the same type to obtain a target call record, the at least two call records of the same type being target call records containing two identical phone numbers, and
        obtaining the N suspicious numbers in the call record set after the removal.

4. A method for determining a spam caller phone number, implemented by a terminal, comprising:
    obtaining, by the terminal, voice call data of a call made with an unknown number and a call record of the call, the call record containing the unknown number and the unknown number not being stored in a contact list;
    converting, by the terminal, the voice call data into text data;
    obtaining, by the terminal, at least one keyword of the text data, the at least one keyword representing a call topic of the text data;
    generating, by the terminal, a target call record according to the obtained at least one keyword and the call record, the target call record containing the unknown number and the at least one keyword; and
    transmitting, by the terminal, the target call record to a server, the server being configured to determine whether the unknown number is a spam caller phone number according to the unknown number and the at least one keyword by:
        obtaining a target call record set formed by target call records containing a first suspicious phone number, the first suspicious phone number having a spam caller feature word in any target call record corresponding to the first suspicious number;

determining a spam caller type of the spam caller feature word according to a corresponding relationship between preset spam caller feature words and spam caller types, the spam caller type indicating a purpose of a spam call corresponding to the first suspicious phone number and the first call record being any call record in the target call record set;

determining the spam caller type of the spam caller feature word in the first call record to be a spam caller type of the first call record;

counting a number of call records corresponding to each spam caller type in the target call record set;

determining a proportion of the each spam caller type in the target call record set according to a ratio of the number of the call records corresponding to the each spam caller type to a total number of call records in the target call record set; and determining the first suspicious phone number as a spam caller phone number if a spam caller type has a proportion larger than a proportion threshold.

5. The method according to claim 4, wherein obtaining the at least one keyword of the text data of the call content comprises:

performing word segmentation on the text data to obtain a word segmentation result containing at least one word;

obtaining a keyword factor of each word in the word segmentation result, the keyword factor scaling positively with a correlation between the topic and the each word, and the correlation indicating a correlativity between the at least one word and the call topic of the text data; and using first M words of the largest the keyword factor sizes as keywords of the text data of the content.

6. The method according to claim 5, wherein obtaining the keyword factor of each word in the word segmentation result comprises:

obtaining a type of the each word in the word segmentation result according to a preset type dictionary, the type representing a feature of the each word;

according to a corresponding relationship between preset types and weights, distributing a weight for the each word according to the type of the each word in the word segmentation result;

obtaining a word frequency of the each word in the word segmentation result; and using a product of the weight and the word frequency of the each word as the keyword factor of the each word.

7. The method according to claim 5, wherein obtaining the keyword factor of each word in the word segmentation result comprises:

removing words of types of modal particles, personal pronouns and adjectives from the word segmentation result to obtain a processed word segmentation result; and obtaining a keyword factor of each word in the word segmentation result after the removal.

8. A device for determining a spam caller phone number, comprising:

a processor; and a memory for storing instruction executable by the processor, wherein the processor is configured to:

obtain at least one target call record from at least one terminal, wherein:

the at least one target call record forms a call record set, the call record set contains a predetermined number of target call records, each of the target call records contains an unknown number and at least one keyword, the at least one keyword is obtained, by the at least one terminal, according to text data of a call with the unknown number, the at least one keyword represents a call topic of the text data, and the unknown number is a number not stored in a contact list of the terminal;

obtain N suspicious numbers in the call record set, wherein the N suspicious numbers are first N unknown numbers in the predetermined number of target call records that have the highest frequencies of appearance;

determine whether a spam caller feature word recorded in a preset dictionary exists in keywords contained in a target call record of each suspicious number;

if a spam caller feature word recorded in the preset dictionary exists in keywords contained in the target call record of a suspicious number, determine the suspicious number to be a spam caller phone number, wherein in determining the suspicious number to be a spam caller phone number, the processor is configured to:

obtain a target call record set formed by target call records containing a first suspicious phone number, the first suspicious phone number having a spam caller feature word in any target call record corresponding to the first suspicious number;

determine a spam caller type of the spam caller feature word according to a corresponding relationship between preset spam caller feature words and spam caller types, the spam caller type indicating a purpose of a spam call corresponding to the first suspicious phone number and the first call record being any call record in the target call record set;

determine the spam caller type of the spam caller feature word in the first call record to be a spam caller type of the first call record;

count a number of call records corresponding to each spam caller type in the target call record set;

according to a ratio of the number of the call records corresponding to the each spam caller type to a total number of call records in the target call record set, determine a proportion of the each spam caller type in the target call record set; and if a spam caller type has a proportion larger than a proportion threshold, determine the first suspicious phone number as a spam caller phone number.

9. The device according to claim 8, wherein the processor is further configured to:

determine a spam caller type having a largest proportion in the target call record set as a spam caller type of the spam caller phone number.

10. The device according to claim 8, wherein:

each of the target call records contains two phone numbers;

the two phone numbers contain an unknown number; and the number obtaining module is configured to:

remove a repeated call record from the call record set, by discarding call records of at least two call records of the same type to obtain a target call record with most keywords, the at least two call records of the same type being target call records containing two identical phone numbers, and obtain the N suspicious numbers in the call record set after the removal.

11. A device for determining a spam caller phone number, comprising:
a processor; and
a memory configured to store instructions executable by the processor,
wherein the processor is configured to:
obtain voice call data of a call made with an unknown number and a call record of the call, the call record containing the unknown number and the unknown number not being stored in a contact list;
convert the voice call data into text data;
obtain at least one keyword of the text data, the at least one keyword representing a call topic of the text data;
generate a target call record according to the obtained at least one keyword and the call record, the target call record containing the unknown number and the at least one keyword; and
transmit the target call record to a server, the server being configured to determine whether the unknown number is a spam caller phone number according to the unknown number and the at least one keyword by:
obtaining a target call record set formed by target call records containing a first suspicious phone number, the first suspicious phone number having a spam caller feature word in any target call record corresponding to the first suspicious number;
determining a spam caller type of the spam caller feature word according to a corresponding relationship between preset spam caller feature words and spam caller types, the spam caller type indicating a purpose of a spam call corresponding to the first suspicious phone number and the first call record being any call record in the target call record set;
determining the spam caller type of the spam caller feature word in the first call record to be a spam caller type of the first call record;
counting a number of call records corresponding to each spam caller type in the target call record set;
determining a proportion of the each spam caller type in the target call record set according to a ratio of the number of the call records corresponding to the each spam caller type to a total number of call records in the target call record set; and
determining the first suspicious phone number as a spam caller phone number if a spam caller type has a proportion larger than a proportion threshold.

12. The device according to claim 11, wherein the processor is further configured to:
perform word segmentation on the text data to obtain a word segmentation result containing at least one word;
obtain a keyword factor of each word in the word segmentation result, the keyword factor scaling positively with a correlation between the topic and the each word, and the correlation indicating a correlativity between the at least one word and the call topic of the text data; and
use first M words of the largest the keyword factor sizes as keywords of the text data of the content.

13. The device according to claim 12, wherein the processor is further configured to:
obtain a type of the each word in the word segmentation result according to a preset type dictionary, the type representing a feature of the each word;
according to a corresponding relationship between preset types and weights, assign a weight for the each word according to the type of the each word in the word segmentation result;
obtain a word frequency of the each word in the word segmentation result; and
use a product of the weight and the word frequency of the each word as the keyword factor of the each word.

14. The device according to claim 11, wherein the processor is configured to:
remove words of types of modal particles, personal pronouns and adjectives from the word segmentation result to obtain a processed word segmentation result; and
obtain a keyword factor of each word in the processed word segmentation result.

* * * * *